US008928520B2

(12) United States Patent
Priest

(10) Patent No.: US 8,928,520 B2
(45) Date of Patent: *Jan. 6, 2015

(54) TRACK FAN REMOTE CONTROL SYSTEM

(71) Applicant: Roger R. Priest, Dallas, TX (US)

(72) Inventor: Roger R. Priest, Dallas, TX (US)

(*) Notice: Subject to any disclaimer, the term of this patent is extended or adjusted under 35 U.S.C. 154(b) by 171 days.

This patent is subject to a terminal disclaimer.

(21) Appl. No.: 13/741,719

(22) Filed: Jan. 15, 2013

(65) Prior Publication Data
US 2013/0127604 A1 May 23, 2013

Related U.S. Application Data

(63) Continuation of application No. 12/630,651, filed on Dec. 3, 2009, now Pat. No. 8,354,948.

(60) Provisional application No. 61/140,421, filed on Dec. 23, 2008, provisional application No. 61/119,510, filed on Dec. 3, 2008.

(51) Int. Cl.
*G08C 17/00* (2006.01)
*G08C 19/16* (2006.01)
*G08C 17/02* (2006.01)
*H04L 12/28* (2006.01)

(52) U.S. Cl.
CPC ............ *G08C 19/16* (2013.01); *H04L 2012/285* (2013.01); *H04L 12/282* (2013.01); *G08C 17/02* (2013.01)
USPC .......................................................... 341/176

(58) Field of Classification Search
USPC .......................................................... 341/176
See application file for complete search history.

(56) References Cited

U.S. PATENT DOCUMENTS

| 5,522,704 A | 6/1996 | Casteel |
| 5,611,668 A | 3/1997 | Yapp et al. |
| 7,586,398 B2 | 9/2009 | Huang et al. |
| 8,123,479 B2 * | 2/2012 | Klemo et al. .................. 416/31 |
| 2003/0164787 A1 | 9/2003 | Dresti et al. |
| 2004/0175281 A1 | 9/2004 | Remington |
| 2008/0183316 A1 | 7/2008 | Clayton |

OTHER PUBLICATIONS

Underwriters Laboratories Inc.; Preliminary Investigation for Track Mounted Fan; Letter to Caframo Ltd. dated Apr. 27, 1993.
Excerpt from the 1995 National Electric Code Committee Report on Proposals.
Gulfans: Remote Control FAQ Troubleshooting Remote Controls; Internet Document (c) 1999, URL: www.eceilingfans.com/remote_control_faq.html.

* cited by examiner

*Primary Examiner* — Howard Williams
(74) *Attorney, Agent, or Firm* — Jackson Walker L.L.P.; Christopher J. Rourk

(57) ABSTRACT

A system using a remote control to provide independent control of power to one or more track fans and track lights, as well as control of speed of rotation of each fan, and brightness of each light across one or more tracks of various types. The remote control also allows groups of track fans and/or track lights to be controlled together, and allows the controlled track fans and track lights to be attached to different tracks.

20 Claims, 11 Drawing Sheets

US 8,928,520 B2

TRACK FAN REMOTE CONTROL SYSTEM

CROSS-REFERENCE TO RELATED APPLICATION

This application is a continuation application of U.S. patent application Ser. No. 12/630,651, filed Dec. 3, 2009, now U.S. Pat. No. 8,354,948; this application also claims priority of U.S. Provisional Application No. 61/140,421 filed Dec. 23, 2008, and U.S. Provisional Application No. 61/119,510 filed Dec. 3, 2008, now expired which are hereby incorporated by reference for all purposes.

FIELD OF THE INVENTION

The invention relates to environmental fans for air circulation, and more particularly to a remote control apparatus and system for track-mounted fans.

BACKGROUND OF THE INVENTION

Restaurants, retail stores, offices, factories, and residences are a few of many types of buildings that require energy efficient and low cost alternatives for managing air temperature and air circulation. One device that is known for such applications is a track-mounted fan that can be used in conjunction with track lighting and other track-mounted fixtures. However, known track-mounted fans suffer from a number of problems. For example, such fans are unstable and are subject to vibration, which can also create problems with other track mounted fixtures. In addition, such track-mounted fans are difficult to control and are often beyond the unaided reach of employees, tenants or others.

SUMMARY OF THE INVENTION

A track fan and associated controller device and system are provided that provide greater flexibility, energy efficiency and personal comfort in both air circulation and illumination, for commercial and residential environments. In one exemplary embodiment of the inventions, track fans, track lights and other track-mounted fixtures are attached to one or more tracks of various types, and are individually controlled by remote control. Remote control functions include power control and adjustment to the direction and speed of rotation of fans and the direction and brightness of lights. In this manner, individual control of individual fixtures or groups of fixtures can be provided, regardless of whether they are on the same or different tracks or track types.

One exemplary technical feature of the present inventions is a universal control system that can accommodate business, commercial and residential needs, such as operational integration with many types of pre-installed track or light fixtures, selectable balance of track fans and track lights, selectable placement of track fans and track lights, use of one or multiple circuits, and use of and across units with various voltages.

DETAILED DESCRIPTION OF PREFERRED EMBODIMENTS

Figure 1:
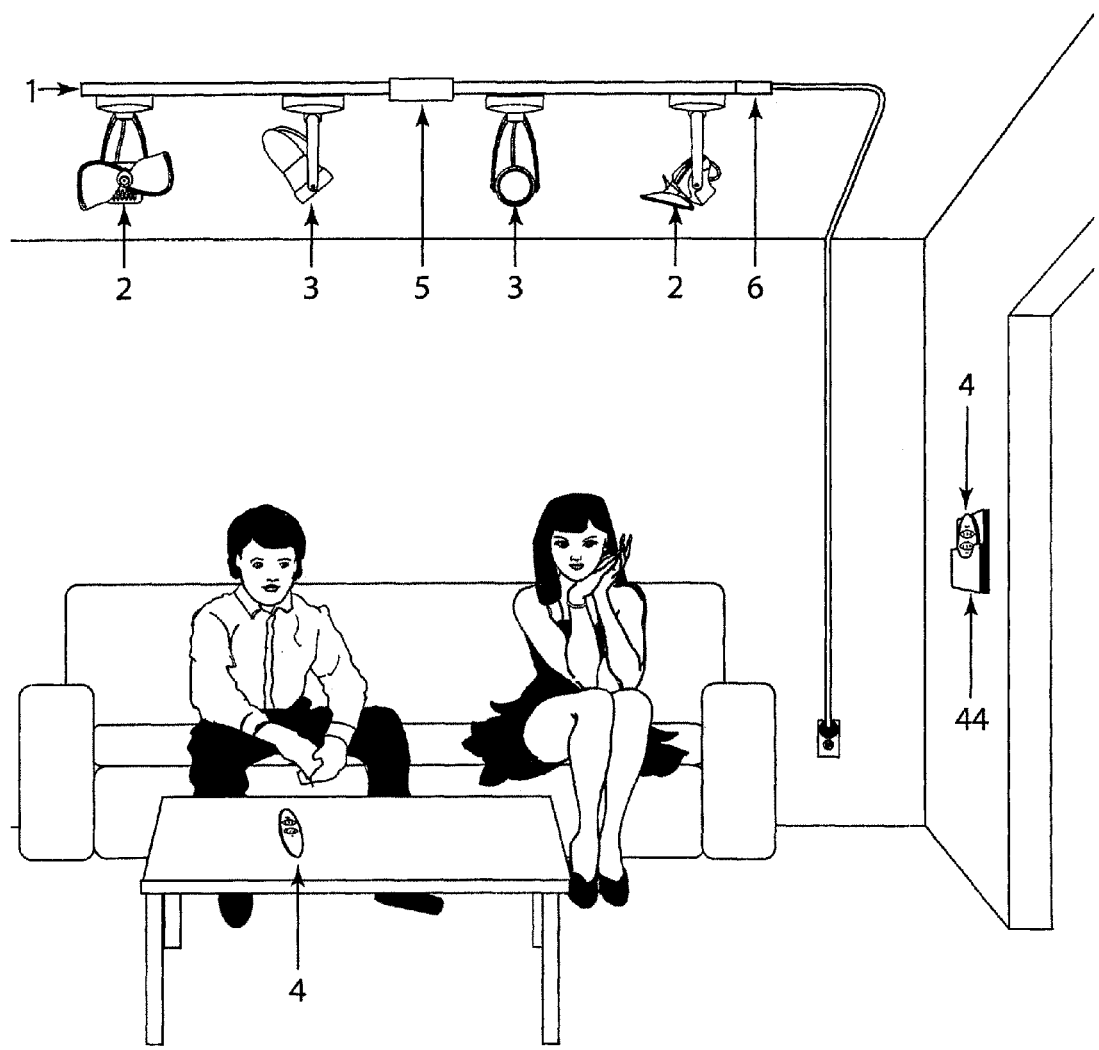
FIG. 1 is a perspective view of various system components of the present inventions in use in an exemplary room environment.

In the description that follows, like parts are marked throughout the specification and drawings with the same reference numerals, respectively. The drawing figures might not be to scale and certain components can be shown in generalized or schematic form and identified by commercial designations in the interest of clarity and conciseness.

In one exemplary embodiment of the present inventions, greater flexibility is provided for moderating localized conditions during a day and throughout the seasons. A given area of a building may change in temperature or lighting conditions over time, such as from changes in sunlight or changes in the use of machines. In this exemplary embodiment of the present inventions, localized areas can be provided with adjustable lighting, adjustable fan speeds, or other environmental modifiers. This control can help to support the environmental needs of workers or patrons in restaurants or bars.

In another exemplary embodiment of the present inventions, lighting and cooling conditions in residential applications can be more accurately controlled. For example, owners of older homes that have lower ceilings will not be able to use a traditional ceiling fan with an attached light fixture, as such units often hang too low for tall people, creating a safety issue, and may not cool the entire room evenly or well. In this exemplary embodiment, homeowners can choose to have multiple smaller fans that better cool the room, and disperse heat throughout the room, and multiple lights that better light the room, all with the added flexibility of being able to choose which lights or fans to have on and to vary the power to each.

Existing track fixtures can also be accommodated using the present inventions. In one exemplary embodiment of the present inventions of FIG. 1, a remote controller 4 individually controls several track fixtures such as track fans 2 and track lights 3, which are attached to a ceiling mounted track 1 such as Halo™ track using standard connectors 5 or 6. The track fans 2 and track lights 3 are controlled by signals transmitted from the transmitter in the remote control 4. The signal frequency is adjusted by the electronically programmable memory unit in the remote control 4 to adjust the signal frequency of track-system receivers for each track fan 2 and each track light 3. The track 1 has one circuit and its power source is from the outlet box in the ceiling.

Figures 2, 3:
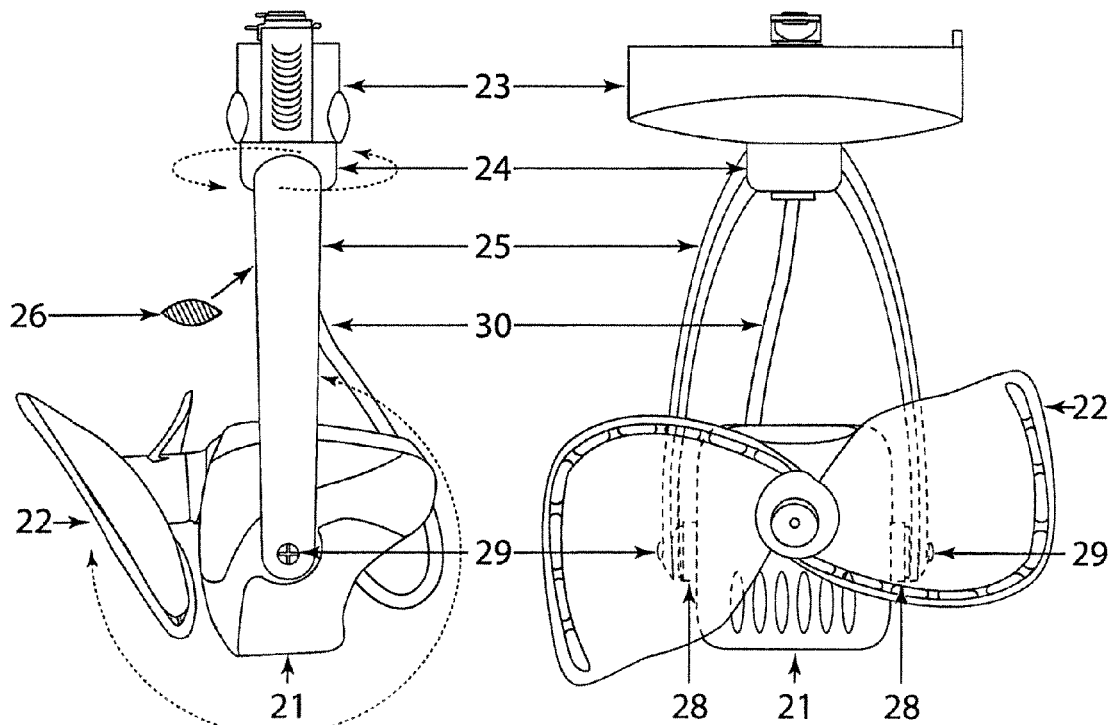
FIG. 2 is an exemplary side view of a fan with a cross section view of the support arms.
FIG. 3 is an exemplary front view of a fan.
Figures 6, 7:
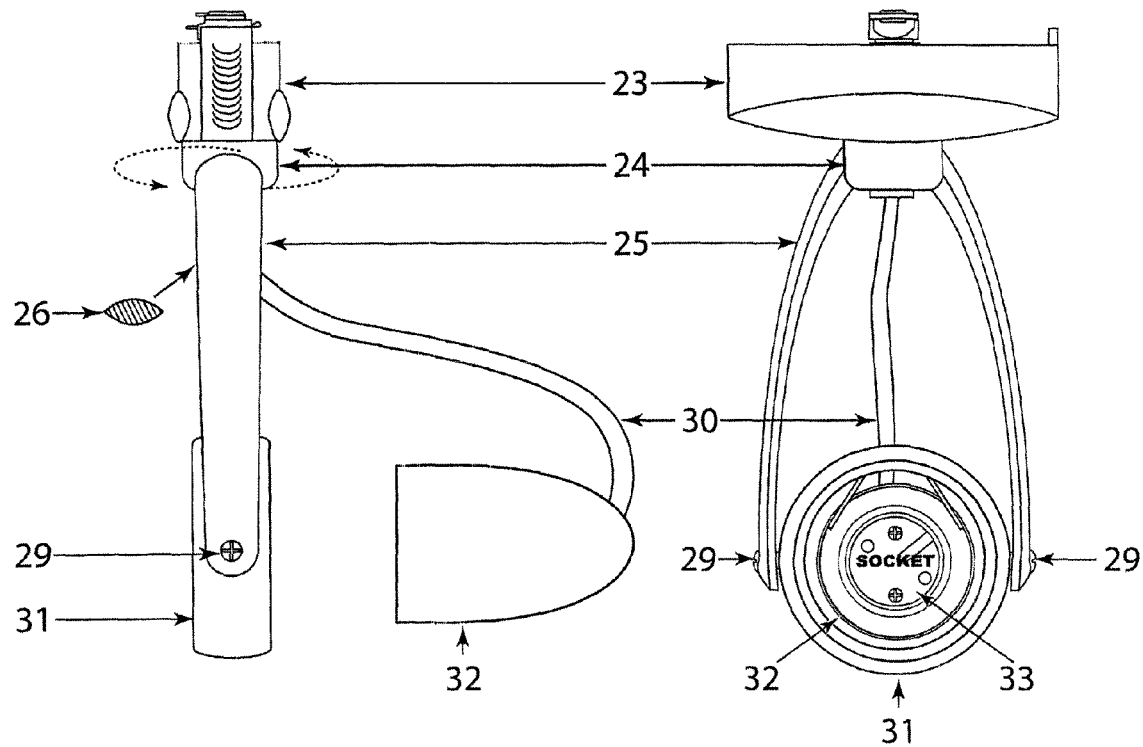
FIG. 6 is an exemplary side view of a track light with a cross section view of the support arms.
FIG. 7 is an exemplary front view of a track light.

Each track fan 2 moves air with a suitable motor, turning short, soft blades. For selected environments such as a low ceiling room or low illumination area, the blades can have a safety LED light on the blades, visible when the blades are rotating. The air movement from the fans can be aimed in different directions by adjustment of forked metal support arms 25 as shown in FIGS. 2 and 3, or using 360°-horizontal swivel stem 24, to control direction of the fan within 300° of vertical space and 360° of horizontal space. The track light fixtures 3 aim illumination in desired directions by adjustment of their swivel stems 24 or forked metal support arms 25 and gimbals 29 or light heads 32 as shown in FIGS. 6 and 7. The track light fixtures have Edison-base or other sockets and are using energy efficient compact fluorescent or LED bulbs, or incandescent bulbs.

In accordance with another exemplary embodiment of the inventions, the remote control 4 can be provided with a programmable selector 1402 and a programmable controller 1404 that are used to set frequencies, data or other controls for predetermined track fans or track lights. Associated controllers in each of the track fans and track lights can be automatically or manually set to match a setting of the controller. Alternatively, a universal controller can be used with pre-existing track fixtures to allow existing equipment to be upgraded to provide additional functionality. The controllers can be set accommodate desired groupings of track fixtures. For example, all track lights and track fans could have the same controller setting, each track light could be set to a separate controller setting to allow individual illumination adjustments, or other suitable combinations can also or alternatively be used. The controller settings can be used to determine the signal frequency transmitted to the track fans and track lights as previously described.

In another exemplary embodiment of the present inventions, the track fans and track lights are temporarily and/or permanently attached to a variety of fixture types, including but not limited to track, rail, and cable lighting fixtures, a single light fixture canopy, a recessed lighting can, a sconce, and a wall fixture. These variations (a) accommodate existing fixtures to reduce the costs of electrical and construction modifications in buildings and (b) bring the air movement and/or illumination closer to people's work or relaxation areas, for example, directly over a couch, a bar or a desk.

In another exemplary embodiment of the present inventions, one or more of the track fans and/or track lights do not include the track-system receiver as an integral part and so are attached to a track-system receiver device that is attached to a track. The attachment is via standard connectors. The track-system receiver device is set to the appropriate frequency by use of the electronically programmable memory unit or by automatically or manually setting its controller.

The track can also be attached to a ceiling or wall in an area that does not have an existing power source so an electric supply with cord 6 in FIG. 1 can be used. The end electric supply with cord attaches to the end of standard track such as Halo™ track. The power cord connects to a wall receptacle or other electrical power source.

A two-circuit track can also or alternatively be used, where track fixtures are electrically attached to one or more of the multi-circuit track's circuits and are controlled independently with the remote control. This exemplary embodiment can be used when existing tracks and other existing fixtures are wired for multiple circuits.

Another exemplary embodiment of the inventions allows track fixtures or devices that use different voltages, such as different voltage levels or A.C. and D.C. voltage. Track fixtures can use numerous different voltages and devices including 12V fractional motors, 24V fractional motors, 120V fractional motors and 240V fractional motors, either AC or DC, and the track lights used include 12V, 24V, 120V and 240V AC and DC. The power is stepped up and down by power controllers, converters or transformers.

FIG. 1 illustrates an exemplary embodiment of the present inventions in a residential or office setting including elements of the first preferred embodiment (track fans and track lights on a ceiling-mounted track controlled by a remote control with electronically programmable controllers. Track fans 2 and track lights 3 are structurally and electrically connected to a one circuit electrical supply track 1, that is electrically connected to a one circuit power supply with a floating canopy electric supply 5, or electrically connected to a power supply using an end electric supply with power cord 6 inserted into a wall receptacle. The energy efficient (low wattage) track fans 2 are remotely turned on and off by pushing the remote fan push button 41 on the hand held remote control 4, independently from the energy efficient track lights 3 (that use compact fluorescent bulbs and/or LED bulbs) that are remotely turned on and off by pushing the remote light push button 42 on the hand held remote control 4. The hand held remote control 4 can be temporarily placed on any cool, dry surface or temporarily placed in the remote control holder/charger 44 that is mounted to a wall switch, wall or other vertical structure and used similar to a wall switch. Remote control holder/charger 44 can be used to recharge remote control 4, so as to avoid the need for replacing batteries. In addition, remote control holder/charger 44 can have a page control to allow remote control 4 to be paged to locate remote control 4.

Remote control holder/charger 44 can also include a screen such as an LED or touch-sensitive screen, to allow system configuration controls to be presented to a user and input into a programmable selector and programmable controller. In one exemplary embodiment, remote control holder/charger 44 can query all track fixtures, and can display a list of available fixtures with user-selectable controls to assign fixtures to a group, to a remote control selector, or other suitable controls. Remote control holder/charger 44 can have a "test" feature to allow each associated fixture to be momentarily operated to confirm its identity on the display. Remote control holder/charger 44 can provide controls for setting light levels, fan levels, light orientations and fan orientations, such as where the base of the track fan or track light includes positioning servo motors that allow the orientation of the track fan or track light to be controlled.

FIG. 3 is an exemplary side view of a track fan 2, showing blades 22 pressed onto a housed 12 volt or 120 volt fractional motor 21 shaft. The housed 12 volt or 120 volt fractional motor 21 can be housed in plastic or other suitable materials, and blades 22 can be plastic finger safe blades or other suitable blades. The entire assembly can be mounted to the support arms 25 with two connecting bolts 29 to allow for over 300° of vertical movement. The support arm 25 can be formed of metal or other suitable materials, and an exemplary cross section 26 is shown. The support arms 25 are joined together with a 360° horizontal swivel 24 that allows for 360° of horizontal movement. The 360° horizontal swivel 24 can be formed of metal or other suitable materials, and can be motorized. Swivel 24 is attached to integrated remote control receiver track adaptor 23 with a grommet that allows for swivel to move through 360° of arc. The electrical supply cord 30 electrically connects the 12 volt or 120 volt fractional motor 21 to the integrated remote control receiver track adaptor 23.

Swivel 24 can include one or more servo motors to allow the horizontal orientation of track fan 2 to be controlled. Fractional motor 21 can include one or more servo motors to allow the vertical orientation of track fan 2 to be controlled. Support arms 25 provide improved stability for motor 21 as compared to a single mount support, due to vibrations that are generated by blades 22, and prevents the fan assembly from experiencing vibration or transferring vibration to other track fixtures, which can result in damage to the track fixtures and potential disengagement of the track fixtures from the track. Motor 21 and blades 22 are likewise balanced so as to provide no net horizontal or vertical force to support arms 25 at rest or in motion, other than a net downward force due to the weight of motor 21 and blades 22.

The complete track fan 2 assembly is electrically and structurally connect to the one circuit electrical supply track 1 by twisting metal prongs and plastic prongs of the integrated remote control receiver track adaptor 23 90° into interior groves of the one circuit electrical supply track 1. The complete track fan 2 assembly locks into place with a spring loaded tab on the plastic housed integrated remote control receiver track adaptor 23 by manually retracting and then springing upward into the long opening of the one circuit electrical supply track 1.

FIG. 3 is an exemplary front view of track fan 2. Spacer 28 is connected between motor 21 and support arms 25 with a connecting bolt 29 that maintains a constant pressure and that holds motor 21 in position. Spacer 28 can be used to provide a servo motor for positioning of motor 21 where motor 21 does not include such servo motors.

Figure 4:
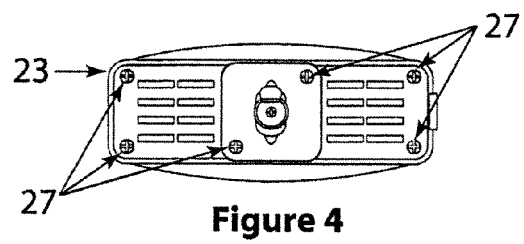
FIG. 4 is an exemplary top view of a fan support.

FIG. 4 is an exemplary top view of track fan 2 that shows integrated remote control receiver 23 with track adaptor screws 27 securing vented top covers and prongs of the track adaptor. A spring loaded tab at one end of the integrated remote control receiver 23 secures and connects the track fan 2 to the one circuit electric supply track 1.

Figure 5:
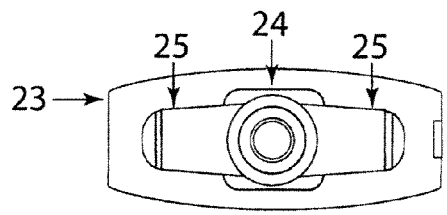
FIG. 5 is an exemplary bottom view of a fan support.

FIG. 5 is an exemplary bottom view of the track fan without the fan and showing support arms 25 joined together with a metal 360° horizontal swivel 24 that allows for 360° of horizontal movement. Swivel 24 is attached to integrated remote control receiver 23 with a grommet to allow for 360° of horizontal movement. A spring loaded tab at one end of the integrated remote control receiver 23 secures and connects the track fan 2 to the one circuit electric supply track 1.

FIG. 6 is an exemplary side view of track light 3 showing gimbal ring 31 connected to support arm 25 with two connecting bolts 29 that allow for over 300° of vertical movement. Support arm 25 cross section 26 is also shown. Support arms 25 are joined together with swivel 24 to allow for 360° of horizontal movement. Swivel 24 is attached to integrated remote control receiver 23 with a grommet or other suitable connector to allow for swivel 24 to move through 360° of arc. The electrical supply cord 30 electrically connects the base socket 33 that is structurally connected to the inside of the base socket housing 32 to the integrated remote control receiver track adaptor 23. The track light 3 assembly electrically and structurally connects to the one circuit electrical supply track 1 by twisting metal and/or plastic prongs of integrated remote control receiver 23 by 90° into the interior groves of the one circuit electrical supply track 1. The complete track light 3 assembly locks into place with a spring loaded tab on the integrated remote control receiver 23 by manually retracting and then springing upward into the long opening of the one circuit electrical supply track 1.

FIG. 7 is an exemplary front view of track light 3 showing gimbal ring 31 connected to support arm 25 with two connecting bolts 29 that allow for over 300° of vertical movement. A lock washer is connected in-between the gimbal ring and support arms 25 with a connecting bolt 29 or other suitable connector that maintains a constant pressure to hold gimbal ring 31 in one position until gimbal ring 31 is moved to another position. The support arms 25 are joined together with a swivel 24 that allows for 360° of horizontal movement. Swivel is attached to integrated remote control receiver 23 with a grommet or other suitable device to allow for 360° horizontal movement. The electrical supply cord 30 electrically connects the base socket 33 that is structurally connected to the inside of the base socket housing 32 to the integrated remote control receiver 23. The complete track light 3 assembly electrically and structurally connects to the one circuit electrical supply track 1 by twisting metal and/or plastic prongs of the integrated remote control receiver 23 90° into the interior grooves of the one circuit electrical supply track 1. The complete track light 3 assembly locks into place with a spring loaded tab on the integrated remote control receiver 23 by manually retracting and then springing upward into the long opening of the one circuit electrical supply track 1.

Figure 8:
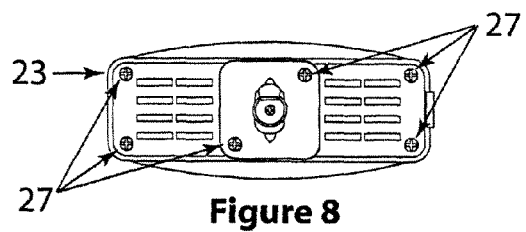
FIG. 8 is an exemplary top view of a track light support.

FIG. 8 is an exemplary top view of track light 3 and the integrated remote control receiver 23 track adaptor screws 27 securing the vented top covers and prongs of the track adaptor. The spring loaded tab at one end of the integrated remote control receiver 23 secures and connects the track light 3 to the one circuit electric supply track 1.

Figure 9:
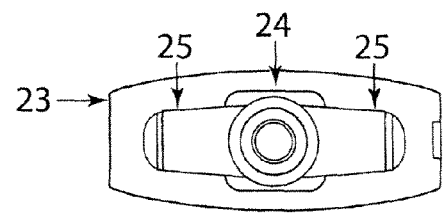
FIG. 9 is an exemplary bottom view of a track light support.

FIG. 9 is an exemplary bottom view of track light 3 showing support arms 25 joined together with a swivel 24 that allows for 360° of horizontal movement. Swivel 24 can be attached to integrated remote control receiver 23 with a metal grommet or other suitable connectors to allow for swivel 24 to move 360° either manually or using a suitable servo motor configuration. The spring loaded tab at one end of the integrated remote control receiver 23 secures and connects the track light 3 to the one circuit electric supply track 1.

Figures 10, 11:
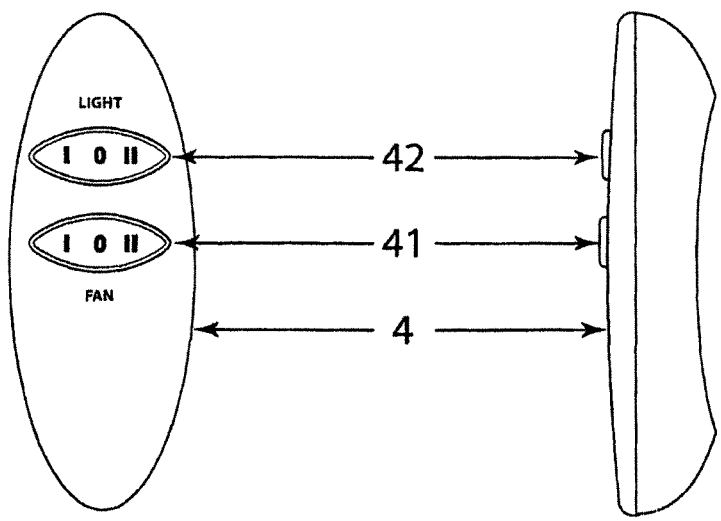
FIG. 10 is an exemplary top view of a remote control.
FIG. 11 is an exemplary side view of a remote control.

FIG. 10 is an exemplary top view of a hand held remote control 4 that shows the remote fan push button 41 and the remote light push button 42. Manually depressing the remote fan push button 41 sends a signal to the integrated remote control receiver track adaptor 23 that remotely turns a track fan 2 on and off. Manually depressing the remote light push button 42 sends a signal to the integrated remote control receiver track adaptor 23 that remotely turns the track light 3 on and off. The signal frequency is adjusted with a controller on each of track fixtures and remote control.

Alternatively, a plurality of light and fan controls can be used, such as by providing a multi-position selector switch, so as to allow individual fans, individual lights, user configurable groups of fans and lights or other suitable configurations to be controlled. A touch-screen or other suitable user interfaces can also or alternatively be used to allow a user to readily configure track fan and light positions, power levels, or other suitable attributes, such as using the functionality of programmable selectors, programmable controllers, servo motors and other remote controlled devices.

FIG. 11 is an exemplary side view of remote control 4 that shows the remote fan push button 41 and the remote light push button 42. Manually depressing the remote fan push button 41 sends a signal to the integrated remote control receiver track adaptor 23 that remotely turns the track fan 2 on and off.

Manually depressing the remote light push button 42 sends a signal to the integrated remote control receiver track adaptor 23 that remotely turns the track light 3 on and off. The signal frequency is adjusted with a programmable controller, programmable selector and other devices in each of track fan 2, track light 3 and remote control 4.

Figures 12, 13:
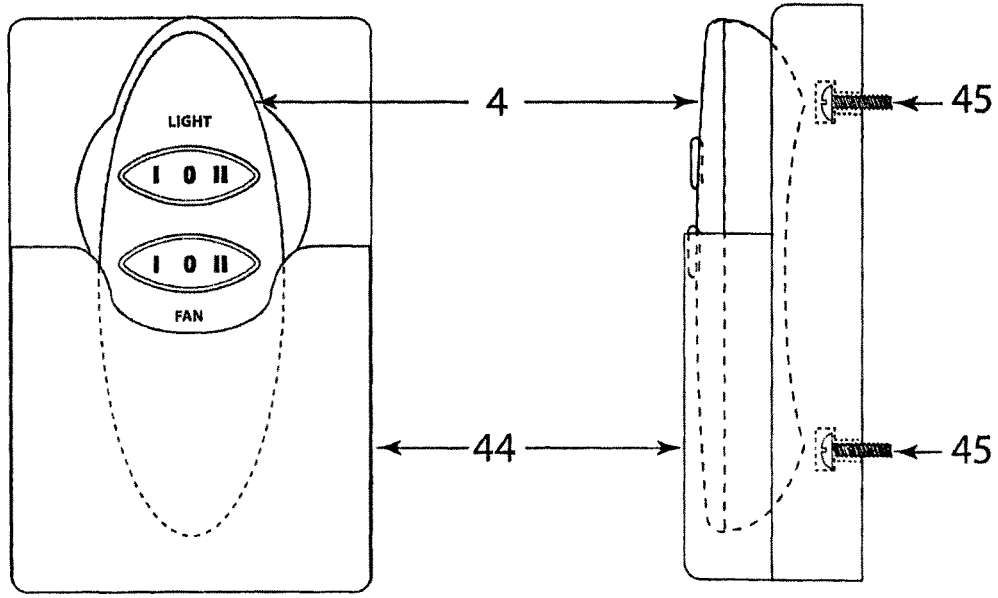
FIG. 12 is an exemplary top view of a remote control in a wall holder/charger.
FIG. 13 is an exemplary side view of a remote control in a wall holder/charger.

FIGS. 12 and 13 are exemplary views of remote controls 4 in wall mounts 44, as previously described.

The use of a remote controlled receiver that is either built into each track fixture's track connector or that is provided in a modular track connector for use with existing equipment allows each track fixture to be individually remotely controlled, such as turned on and off, for power levels to be controlled, for servo motor orientation to be controlled, in conjunction with new or existing one circuit track lighting track without any extra parts and wiring, and without the extra expense and time of two circuit track lighting track. Likewise, the system can also be installed on existing two circuit track lighting tracks with the same results.

Figure 14:
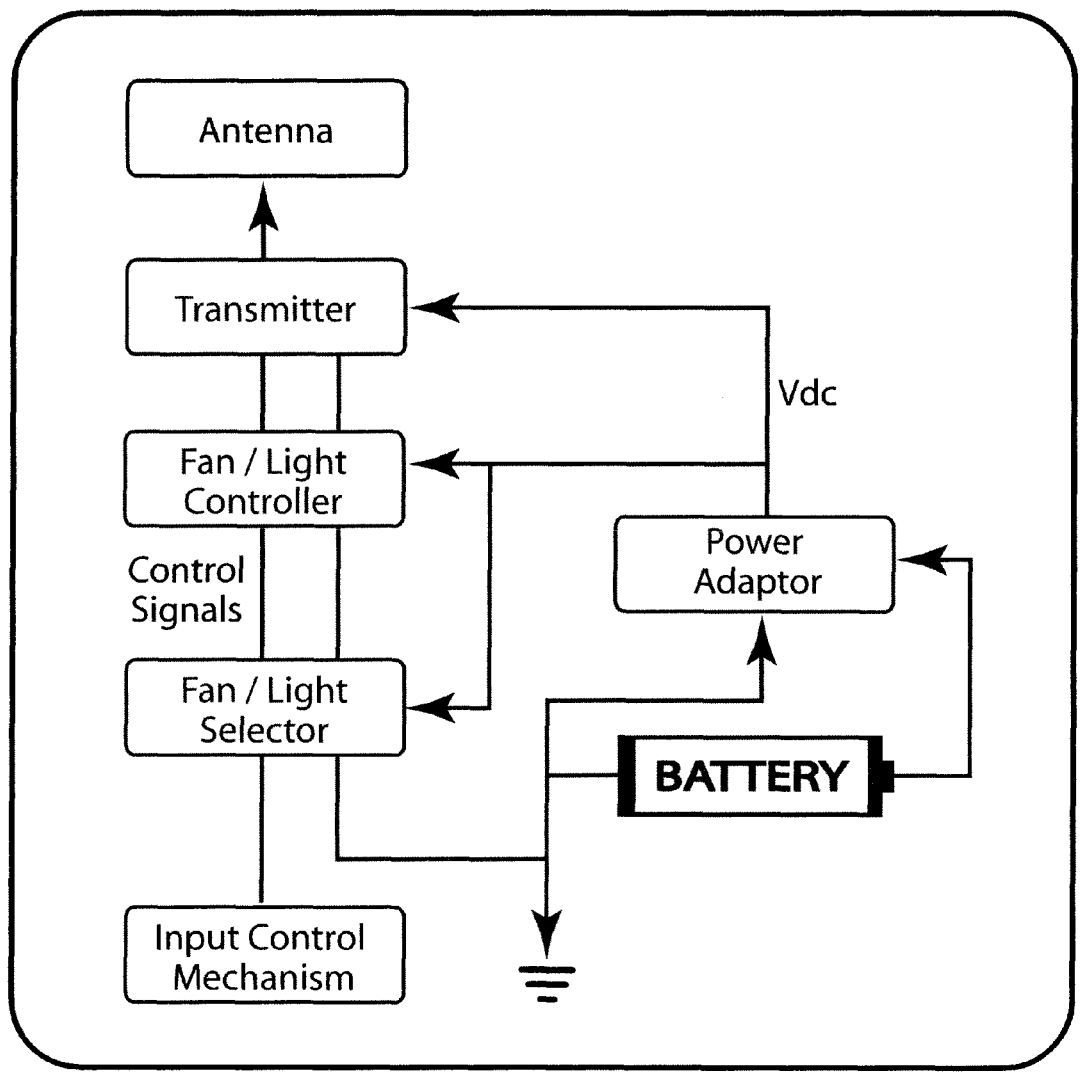
FIG. 14 is an exemplary diagram of a remote control in accordance with an exemplary embodiment of the present invention.

FIG. 14 is an exemplary diagram of a remote control 1400 in accordance with an exemplary embodiment of the present invention. Remote control 1400 can be in a handheld device, on a wall mounted device for recharging a handheld device, or in other suitable devices. Remote control 1400 includes fan/light selector 1402, which can detect track fixtures by querying fixtures and receiving identification data, such as on a general data channel, and is coupled to and can also receive user selections from input control mechanism 1410. In one exemplary embodiment, fan/light selector 1402 can be one or more dip switches, a programmable controller, an application specific integrated circuit (ASIC) or other suitable devices that generates a query command on a predetermined frequency and that processes the responses to generate a user display showing devices. In another exemplary embodiment, fan/light selector 1402 can be a programmable controller or ASIC that generates a user input sequence for input control mechanism 1410, such as a series of screens for a user to enter device identifiers and locations, groups of devices, power levels or configurations for devices, or other suitable device data. Fan/light selector 1402 can thus allow a user to either manually enter and control fixtures or can automatically detect fixtures and allow a user to select control settings.

Fan/light controller 1404 can be a programmable controller, ASIC or other device that generates control data for controlling the operation of a fixture. In one exemplary embodiment, fan/light controller 1404 can receive controls from fan/light selector 1402 or input control mechanism 1400, and can generate digital data or modulate frequencies to control one or more track fixtures. Fan/light controller 1404 is coupled to fan/light selector 1402 and transmitter 1406.

Transmitter 1406 generates controllable radio frequency transmissions, such as using modulation techniques to allow data to be modulated and transmitted to receivers. Amplitude modulation, frequency modulation, phase shift keying modulation, time division multiplexing or other suitable modulation techniques can be used. The modulated radio frequency data is transmitted though antenna 1408. Antenna 1408 can also be used to receive data from track fixtures that are enabled to transmit data in response to general configuration queries.

Figure 15:
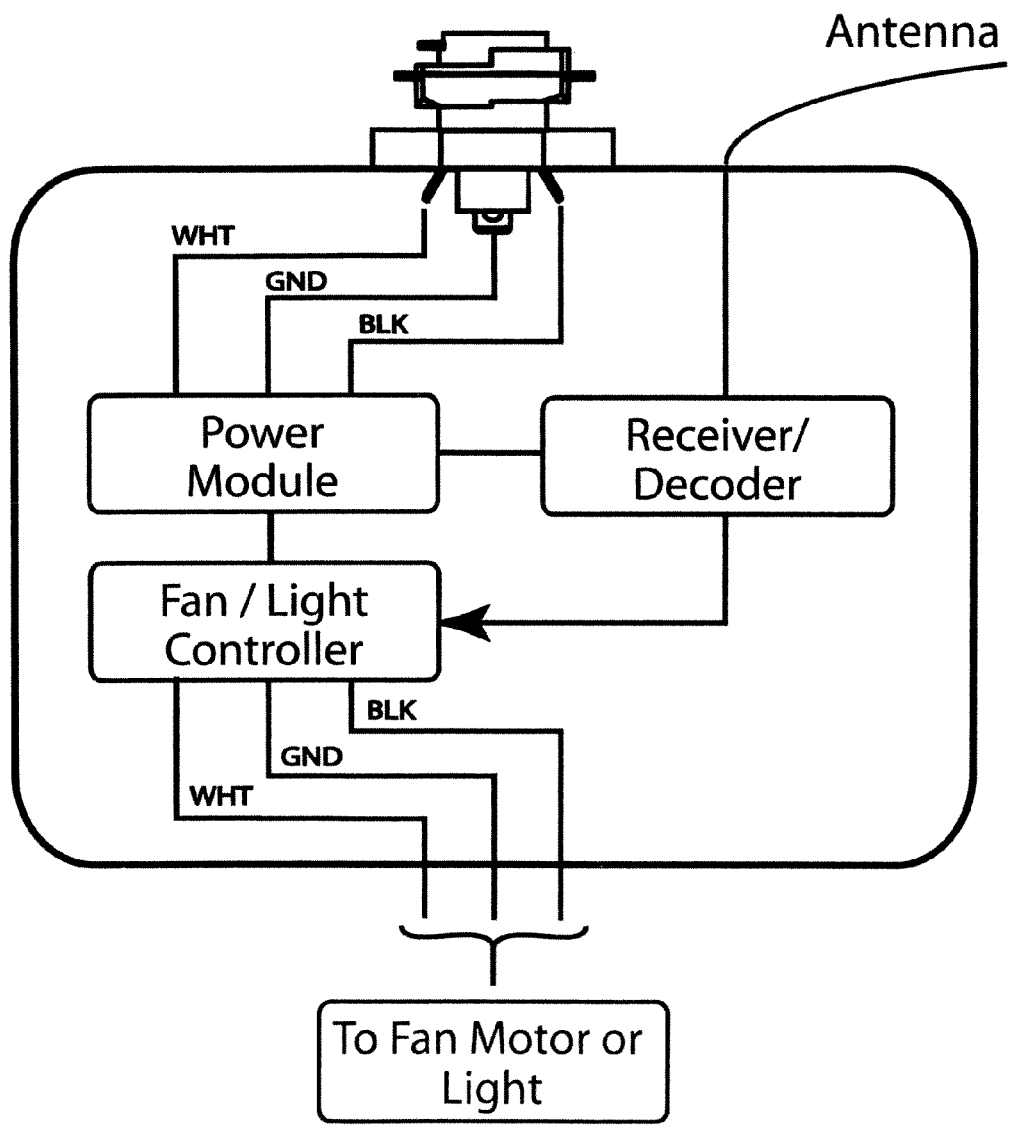
FIG. 15 is a diagram of a track system receiver in accordance with an exemplary embodiment of the present invention.

FIG. 15 is a diagram of a track system receiver in accordance with an exemplary embodiment of the present invention. A receiver/decoder 1502, which can be a radio receiver or other suitable devices, receives encoded data on a radio frequency or frequencies from the remote controller. Fan/light controller 1504 can be a dip switch, a programmable controller, an ASIC or other suitable devices that decodes the encoded data and generates suitable controls, including but not limited to responses to configuration queries (e.g. a unique device number, a model identifier, available power levels and control settings), responses to control signals (e.g. changes to power settings, changes to servo motor settings, reset of settings) or other suitable controls. Power module 1506 is coupled to and provides power to receiver/decoder 1502 and fan/light controller 1504, as well as the associated fan motor, lighting assembly or other track fixture. Power module 1506 can detect power fluctuations that indicate damaging vibrations that may be occurring and can include over current, over voltage or other protective circuitry to disable a track fixture if it is misoperating.

Figure 16:
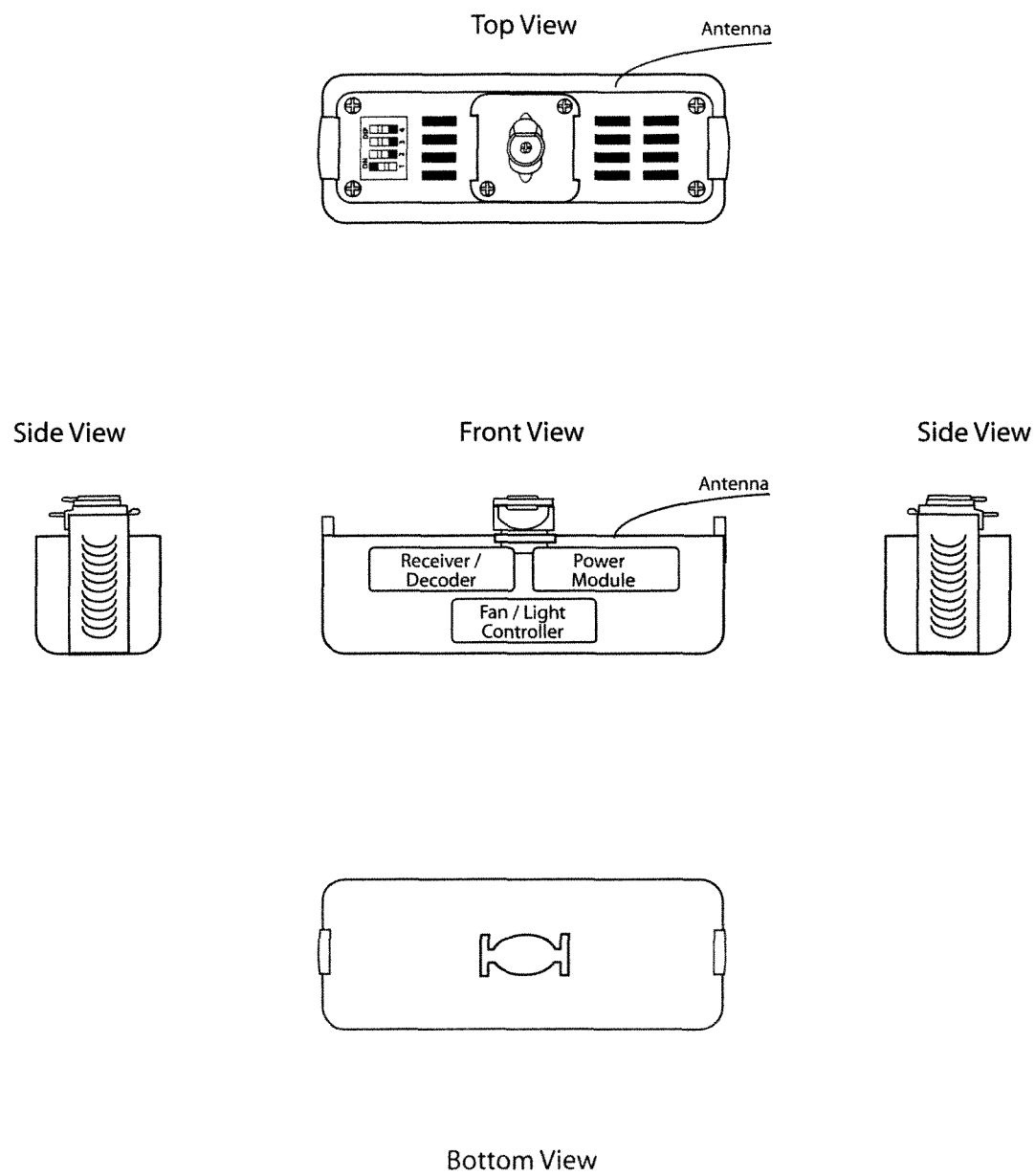
FIG. 16 is a diagram of an exemplary universal receiver, which can be used with existing equipment or as a module in conjunction with track fixtures that are optimized for use with the universal receiver.

FIG. 16 is a diagram of an exemplary universal receiver, which can be used with existing equipment or as a module in conjunction with track fixtures that are optimized for use with the universal receiver.

Figure 17:
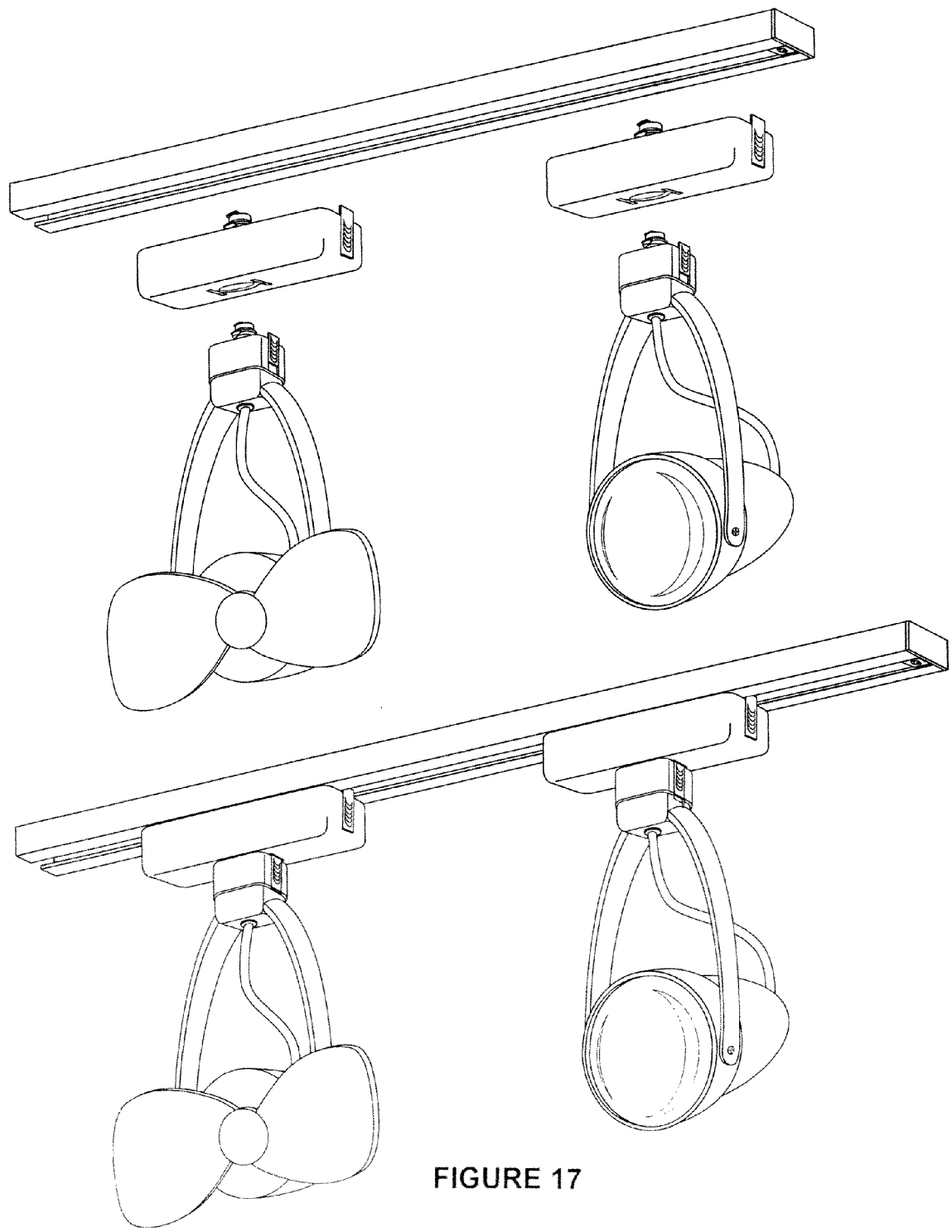
FIG. 17 shows exemplary configurations of track fixtures with receivers for use with the present inventions.

FIG. 17 shows exemplary configurations of track fixtures with receivers for use with the present inventions.

Figure 18A:
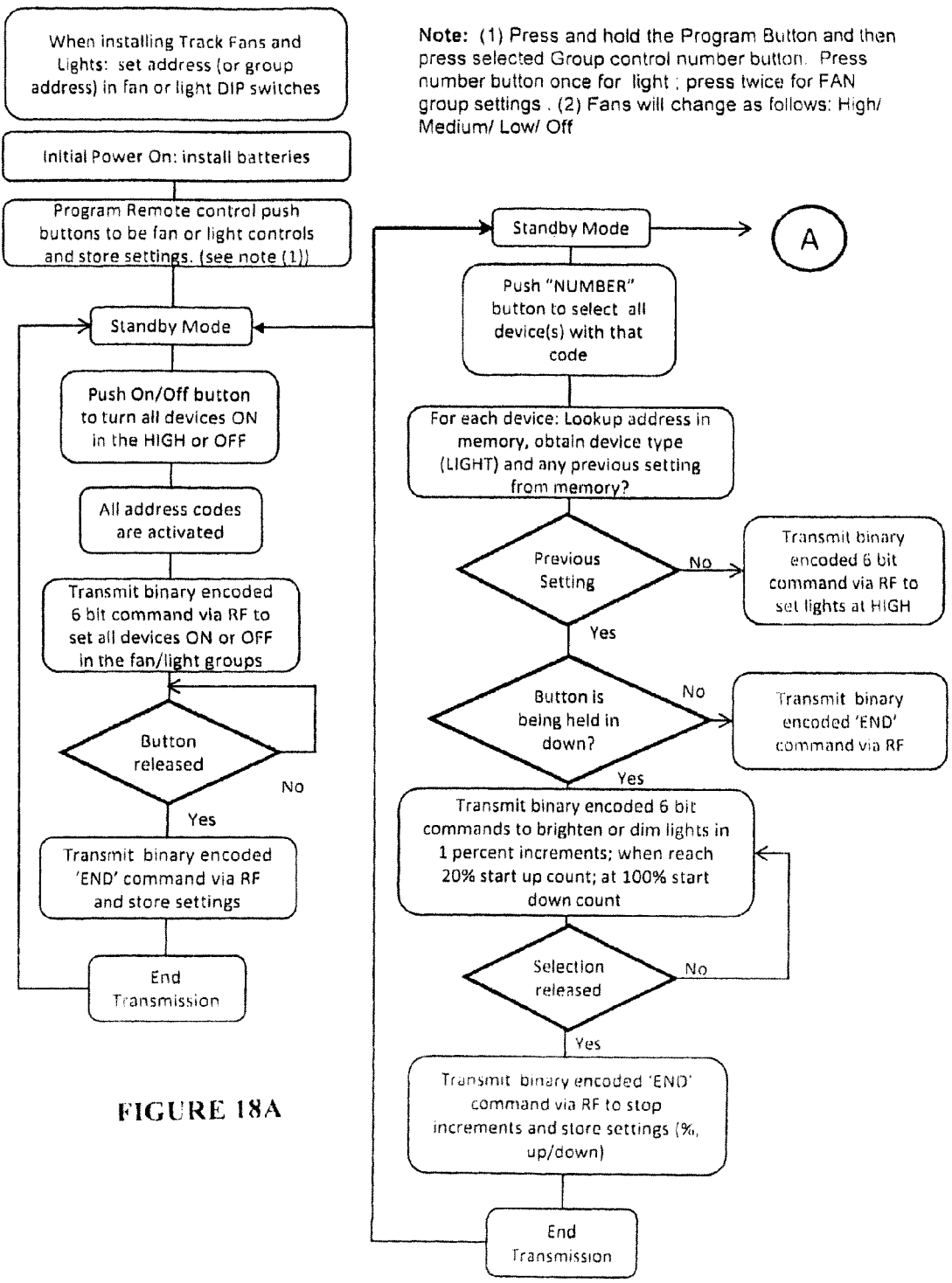
FIGS. 18A-18C are exemplary control algorithms in accordance with the present inventions.
Figure 18B:
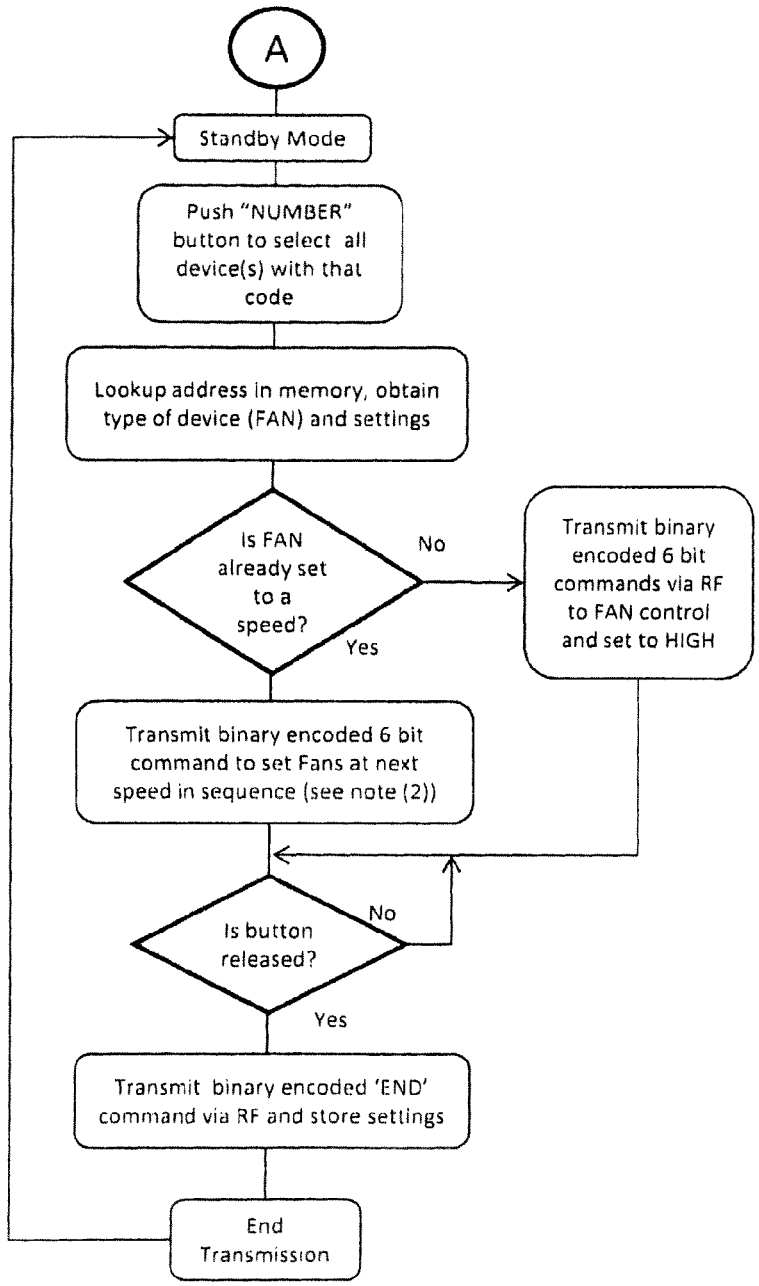
Figure 18C:
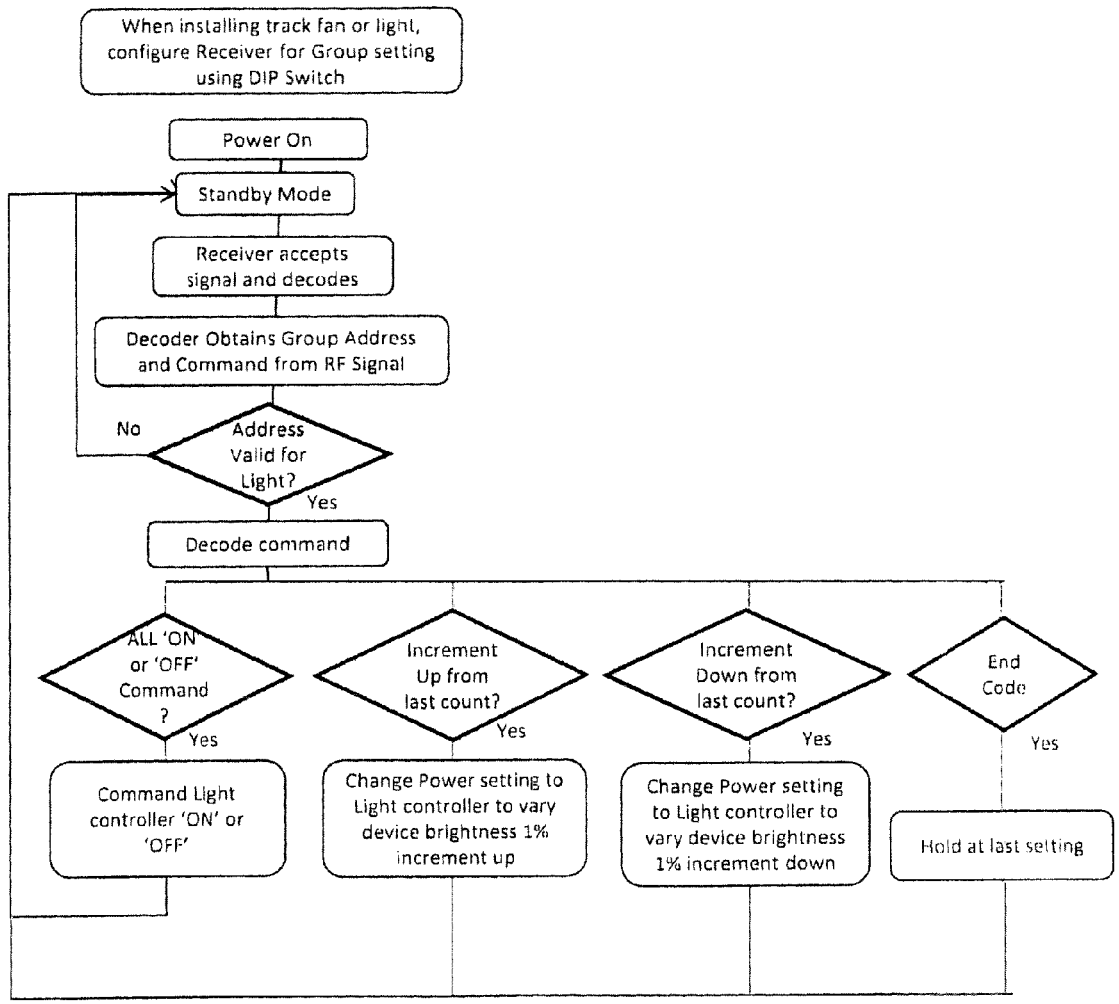

FIGS. 18A-18C are flow diagrams of an exemplary process for configuring a system utilizing the teachings of the present inventions.

While certain exemplary embodiments have been described in detail and shown in the accompanying drawings, it is to be understood that such embodiments are merely illustrative of and not restrictive on the broad invention. It will thus be recognized to those skilled in the art that various modifications may be made to the illustrated and other embodiments of the invention described above, without departing from the broad inventive scope thereof. It will be understood, therefore, that the invention is not limited to the particular embodiments or arrangements disclosed, but is rather intended to cover any changes, adaptations or modifications which are within the scope and the spirit of the invention defined by the appended claims.

What is claimed is:

1. A system for controlling a plurality of devices comprising:
    a remote control configured to individually control multiple track fixtures:
    an input control mechanism configured to receive a plurality of commands to adjust one or more settings of one or more of the track fixtures; and
    one of the track fixtures having an associated control mechanism configured to receive commands from the remote control, the track fixture further comprising a power module coupled to a receiver and a fan controller, the power module configured to detect an unbalanced condition in a fan and to disable operation of the fan.

2. The system of claim 1 wherein the remote control further comprises logic configured to control one or more of the track fixtures.

3. The system of claim 1 wherein the remote control further comprises a touch screen display.

4. The system of claim 1 wherein the remote control further comprises logic configured to generate a list of available fixtures on a touch screen display.

5. The system of claim 1 wherein the remote control further comprises logic configured to allow a user to group two or more of the fixtures into a user-defined group using a touch screen display.

6. The system of claim 1 wherein the remote control further comprises logic configured to simultaneously control an operational characteristic of two or more of the fixtures using a touch screen display.

7. The system of claim 1 wherein the track fixture further comprises a receiver configured to receive encoded data on a wireless signal from the remote control and for decoding the encoded data.

8. The system of claim 1 wherein the track fixture further comprises a fan controller configured to receive decoded data from a receiver and to change an operational setting of a fan.

9. The system of claim 1 wherein the track fixture further comprises control logic configured to respond to a query from the remote control with configuration data for the track fixture.

10. The system of claim 8 wherein the fan comprises:
an opposing pair of support arms affixed to a swivel; and
a balanced motor and fan assembly that applies a net downward force to the support arms when the fan is in operation.

11. A system comprising:
a track fixture having an associated control mechanism configured to receive commands from a remote control, wherein the track fixture further comprises a fan controller configured to change an operational setting of a fan, wherein the fan comprises:
an opposing pair of support arms affixed to a swivel; and
a balanced motor and fan assembly that applies a net downward force to the support arms when the fan is in operation;
control logic configured to respond to a query from the remote control with configuration data for the track fixture; and
a power module coupled to the receiver and the fan controller, the power module configured to detect an unbalanced condition in the fan and to disable operation of the fan.

12. The system of claim 11 further comprising an input control mechanism configured to receive a plurality of commands to adjust one or more settings of two or more track fixtures.

13. The system of claim 11 wherein the remote control further comprises:
a touch screen display;
logic configured to generate a list of available fixtures;
logic configured to allow a user to group two or more fixtures into a user-defined group; and
logic configured to simultaneously control an operational characteristic of the two or more fixtures.

14. The system of claim 11 wherein the remote control further comprises a touch screen display.

15. The system of claim 11 wherein the remote control further comprises logic configured to generate a list of available track fixtures.

16. The system of claim 11 wherein the remote control further comprises logic configured to allow a user to group two or more track fixtures into a user-defined group.

17. The system of claim 11 wherein the remote control further comprises logic configured to simultaneously control an operational characteristic of two or more track fixtures.

18. The system of claim 11 wherein the remote control further comprises:
a touch screen display; and
logic configured to generate a list of available track fixtures.

19. The system of claim 11 wherein the remote control further comprises:
a touch screen display;
logic configured to generate a list of available track fixtures; and
logic configured to allow a user to group two or more track fixtures into a user-defined group.

20. The system of claim 11 wherein the remote control further comprises:
logic configured to generate a list of available fixtures;
logic configured to allow, a user to group two or more fixtures into a user-defined group; and
logic configured to simultaneously control an operational characteristic of the two or more fixtures.

* * * * *